United States Patent [19]

Taniguchi

[11] 4,323,271
[45] Apr. 6, 1982

[54] STRUCTURE FOR MOUNTING A STRIKER ON A VEHICLE BODY

[75] Inventor: Tomio Taniguchi, Toyota, Japan

[73] Assignee: Toyota Jidosha Kogyo Kabushiki Kaisha, Toyota, Japan

[21] Appl. No.: 164,914

[22] Filed: Jun. 30, 1980

[30] Foreign Application Priority Data

Jul. 11, 1979 [JP] Japan .................. 54-94496[U]

[51] Int. Cl.³ ............................................ E05C 13/00
[52] U.S. Cl. ............................................... 292/341.18
[58] Field of Search ................. 292/341.18, 341.19, 292/216

[56] References Cited

U.S. PATENT DOCUMENTS 2,993,719  7/1961  Manchester ............... 292/341.18
3,006,677 10/1961  Royalty ..................... 292/341.18

FOREIGN PATENT DOCUMENTS 571621  3/1959  Canada ...................... 292/341.18

Primary Examiner—Richard E. Moore
Attorney, Agent, or Firm—Stevens, Davis, Miller & Mosher

[57] ABSTRACT

A striker cooperates and engages with a door lock mechanism of vehicles so as to lock the door. A body of the vehicles has at least two bolt insert apertures at the striker mounting position. A plate member has at least two apertures at the positions corresponding to the positions of the bolt insert apertures. The plate member is provided with nuts welded thereto at the positions of the apertures and at least one weld position which is distanced from the bolt insert apertures and at which position the plate member is welded to the striker mounting position of the vehicle body. The plate member is also provided with at least one deformable portion which connects the weld position to the nut positions of the plate member, so that the striker mount position can be adjusted by the deformation of the deformable portion when the striker is mounted on a vehicle body by means of bolts which are engaged with the nuts.

5 Claims, 12 Drawing Figures

STRUCTURE FOR MOUNTING A STRIKER ON A VEHICLE BODY

BACKROUND OF THE INVENTION

This invention generally relates to a structure of a locking mechanism of a door of a vehicle, and more particularly relates to a structure for mounting a striker on the body of a vehicle. The striker cooperates and engages with a locking mechanism of the door so that the door is tighlty locked.

Such a striker is generally mounted on a center pillar and/or a quarter panel of a vehicle body, or the like. In such a case, it is necessary to align the position of the striker and the position of the door locking mechanism so that the position of the striker can be adjusted horizontally and/or vertically. Therefore, the striker should not be mounted by such as welding nuts for mounting the striker, which nuts directly and rigidly secured to the door body. According to the conventional art, an auxiliary plate to which nuts are rigidly secured is mounted with a slight play on a retainer rigidly secured to the vehicle body.

SUMMARY OF THE INVENTION

An object of the present invention is to provide a structure for mounting a door striker on a vehicle body so that said mounting of said striker can be easily carried out and easily adjusted.

Another object of the present invention is to provide such a structure without a retainer such as mentioned above so that a simple and low-cost striker structure can be provided.

According to the present invention, there is provided a structure for mounting a striker on a vehicle body, said striker cooperating and engaging with a door lock mechanism of said vehicle so that the door is locked, wherein said structure comprises, said vehicle body having at least two bolt insert apertures at the striker mounting position; a plate member having at least two apertures at the positions corresponding to the positions of said bolt insert apertures, said plate member having nuts welded thereto around said bolt insert apertures and at least one weld position which is apart from said bolt insert apertures and at which position said plate member is welded to the striker mounting position of the vehicle body; said plate member being provided with at least one deformable portion which connects said weld position to said nut positions of said plate member, so that the striker mount position can be adjusted by the deformation of said deformable portion when said striker is mounted on the vehicle body by means of bolts which are engaged with said nuts.

BRIEF DESCRIPTION OF THE DRAWINGS

FIGS. 9 through 12 are views illustrating a mounting structure of the prior art, wherein;

FIG. 9 is a perspective view seen from the inside of a vehicle body;

FIG. 10 is a plan view seen from the inside of a vehicle body;

FIG. 11 is a cross-sectional view taken along line XI—XI in FIG. 10, and;

FIG. 12 is an enlarged cross-sectional view taken along line XII—XII in FIG. 11.

DESCRIPTION OF THE PRIOR ART

Figure 5:
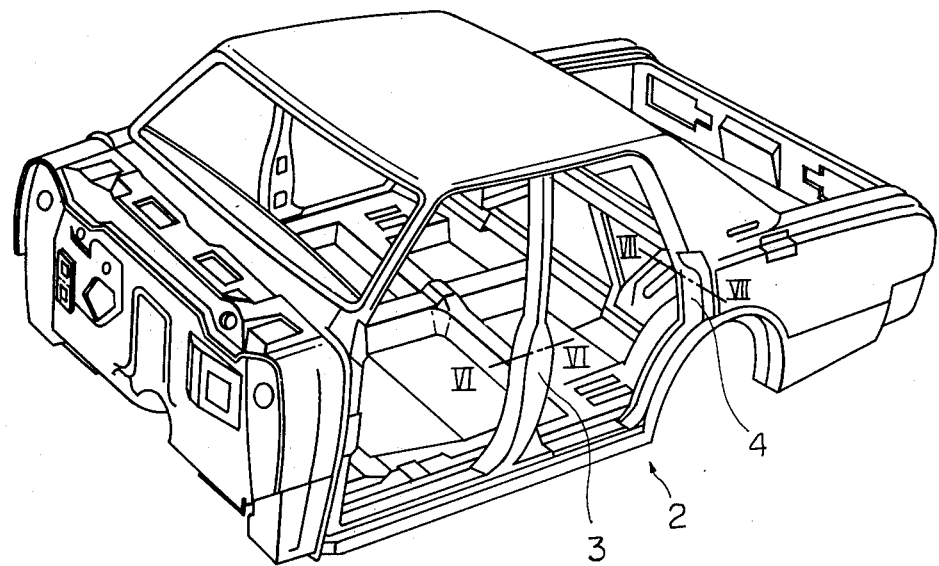
FIG. 5 is a partial perspective view of a vehicle body.
Figure 7:
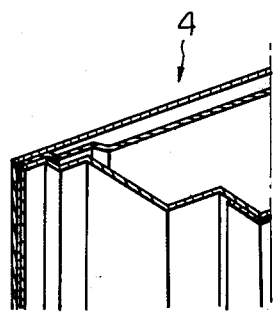
FIG. 7 is a perspective or enlarged cross-sectional view taken along line VII—VII in FIG. 5.
Figure 6:
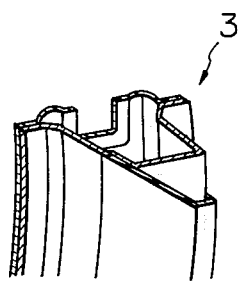
FIG. 6 is a perspective or enlarged cross-sectional view taken along line VI—VI in FIG. 5.
Figure 8:
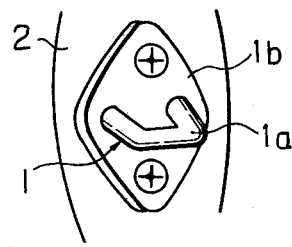
FIG. 8 is a perspective view illustrating a striker which is secured to a door body.
Figure 9:
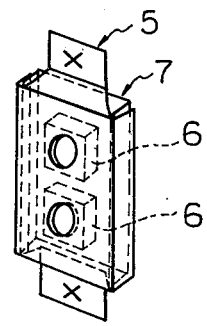
Figure 10:
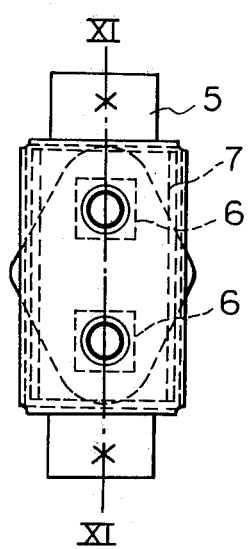
Figure 11:
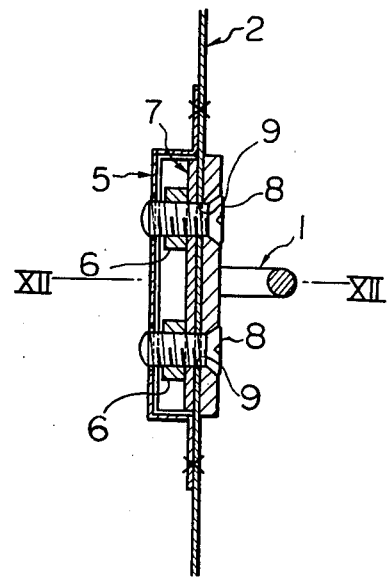
Figure 12:
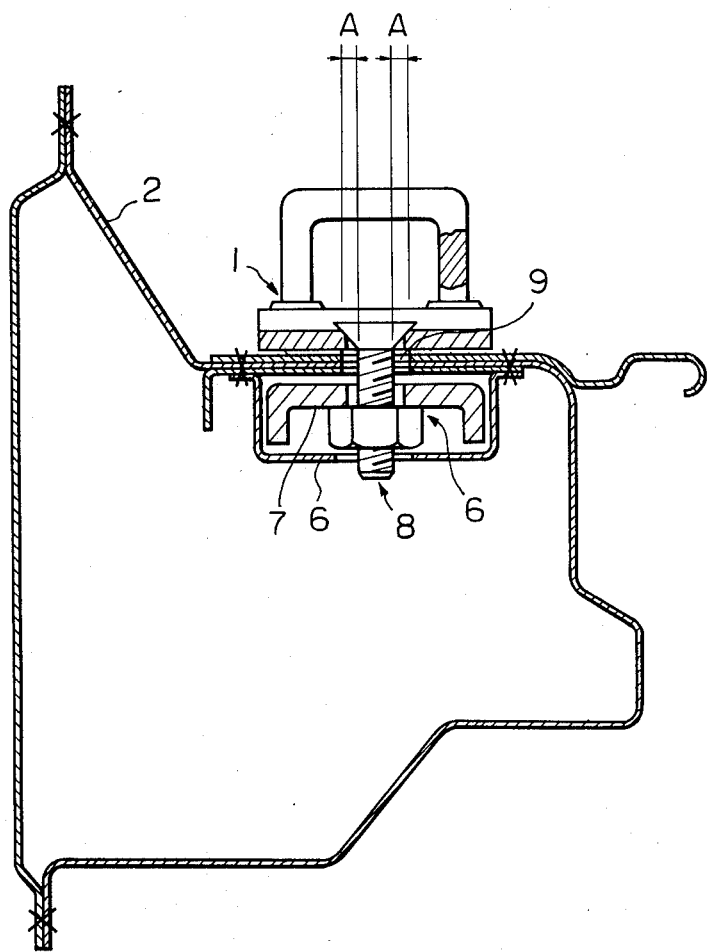

A striker 1 (FIG. 8) for locking a door (any not shown door in FIG. 5) is mounted on a center pillar 3 and quarter panel 4 of a body 2 illustrated in FIG. 5. FIG. 6 illustrates a center pillar 3, and FIG. 7 illustrates a quarter panel 4. In FIG. 8, the striker 1 comprises a U-shaped portion 1a which engages with a locking mechanism (not shown) mounted on a door body and base portion 1b integrally constructed with the U-shaped portion 1a. In FIGS. 9 through 12, a box-like retainer 5 is rigidly welded to the inside of the body 2 (FIGS. 11 and 12). An auxiliary plate 7 to which nuts 6 are rigidly attached is secured in the retainer 5 with a slight play horizontally and vertically. The body 2 has bolt inset apertures 9 (FIGS. 11 and 12) through which bolts 8 are inserted. When the striker is mounted on the vehicle body 2, the bolts 8 are engaged with and fastened to the nuts 6, as illustrated in FIGS. 11 and 12. Because the auxiliary plate 7 is secured by the retainer 5 with a certain play and the diameter of the aperture 9 is slightly larger than the diameter of the bolts 8, the position of the striker with respect to the body 2 can be adjusted within a range A, as illustrated in FIG. 12.

DESCRIPTION OF PREFERRED EMBODIMENTS

Figure 1:
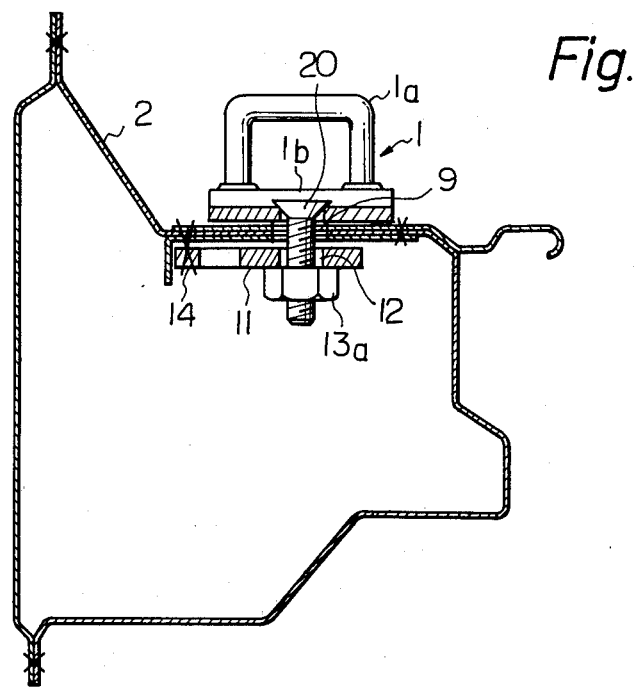
FIG. 1 is a cross-sectional view illustrating a structure for mounting a door lock striker according to the present invention.

Referring to FIGS. 1 through 4, the vehicle body 2 (FIG. 1), such as center pillars or quarter panels, has striker mount positions, in which at least two bolt insert apertures 9 (FIG. 1) are provided, in the same manner as the conventional structure. Plate members 11, illustrated in FIGS. 2 through 4 in plan views, are each provided with at least two apertures 12 (only one aperture 12' is illustrated in FIG. 1) at the positions corresponding to the position of the bolt insert apertures 9 of the body 2. Nuts 13a and 13b are rigidly secured by welding them to the plate member 11 around the apertures 12 thereof.

Figure 2:
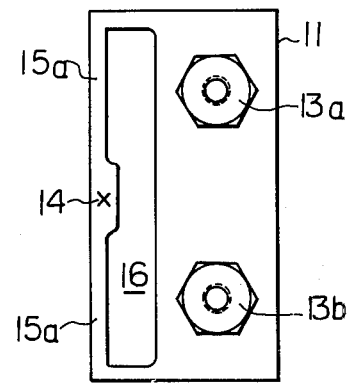
FIGS. 2 through 4 are plan views illustrating respective embodiments of plate members for securing nuts used in the present invention.
Figure 3:
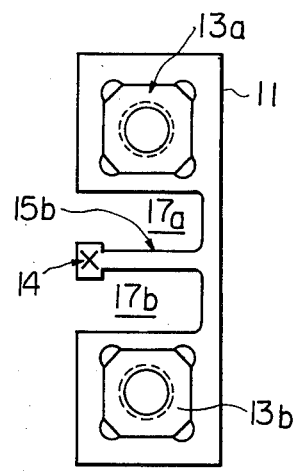
Figure 4:
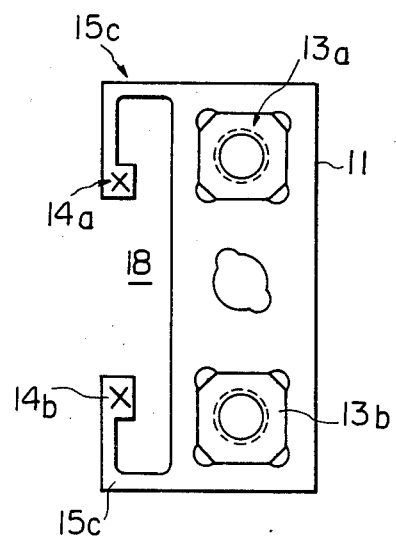

The plate member 11, the possible shapes of which are illustrated in FIGS. 2 through 4, has at least one position 14, 14a, and 14b at which the plate member 11 should be welded to the back surface of the striker mount position of the body 2 and which are distanced from the positions of the nuts 13a and 13b. According to the embodiments illustrated in FIGS. 2 and 3, the plate member 11 has one weld position 14. The weld position 14 is preferably arranged so that the distances between the weld position 14 and the positions of the two nuts 13a are the same, as illustrated in the drawings. According to the embodiment illustrated in FIG. 4, the plate member 11 has two weld positions 14a and 14b which are preferably arranged so that the distance between the weld position 14a and the position of the nut 13a equals the distance between the weld position 14b and the position of the nut 13b.

The plate member 11 has at least one deformable portion 15a (in FIG. 2), 15b (in FIG. 3) or 15c (in FIG. 4) which connects the weld positions 14 (14a, 14b) to the mount positions of the nuts 13a and 13b of the plate member 11. In the embodiment illustrated in FIG. 2, the plate member 11 has a large opening 16 so that the deformable portions 15a are formed as continuous thin remaining portions on the periphery of the plate member 11. In the embodiment illustrated in FIG. 3, the plate member 11 has two openings 17a and 17b formed between the mount positions of nuts 13a and 13b, respectively, and the weld position 14 so that the deformable portion 15b is formed as a thin remaining portion which connects the weld position 14 to the nut mount portion of the plate member 11. In the embodiment illustrated in FIG. 4, the plate member 11 has a large opening 18 between the two weld positions 14a and 14b, shaped so that the deformable portions 15c are formed as peripheral thin portions which connect these weld positions 14a and 14b to the main part of the plate member 11. Such deformable portions 15a, 15b and 15c may be formed integrally with the plate member 11 when the latter is made by pressing.

In order to mount the plate member 11 having such a shape such as those illustrated in FIGS. 2 through 4 above, the plate member 11 is arranged so that the positions of the nuts 13a and 13b are aligned with the bolt insert apertures 9, and then the weld portions 14, 14a and 14b are welded to the back surface of the striker mount portion of the body 2. As illustrated in FIG. 1, striker 1 can be rigidly secured by inserting a bolt 20 into the apertures of the base portion 1b of the striker 1 from the outside of the body 2 and fastening the nut 13a to the bolt 20, in the same manner as the conventional structure mentioned above. However, according to the present invention, if it is necessary to adjust the position of the striker 1 before the striker 1 is rigidly secured to the body 2, the U-shaped portion 1a of the striker 1 may be adjusted horizontally and/or vertically when the the striker is loosely secured to the body 2. In that case, the deformable portions 15a, 15b, 15c are deformed and the positions of the nuts 13a and 13b are changed so that the striker mount position is easily adjusted. The inner diameter of the bolt insert apertures 9 is slightly larger than the diameter of the bolt 20, in the same manner as the conventional structure. The bolt 20 is preferably a counter-sunk bolt having a flush head, as illustrated in FIG. 1.

I claim:

1. A structure for mounting a striker on a body of a vehicle, said striker cooperating and engaging with a door lock mechanism of said vehicle so that the door is locked, wherein said structure comprises, said vehicle body having at least two bolt insert apertures at the striker mounting position;

a plate member having at least two apertures at the positions corresponding to the positions of said bolt insert apertures, said plate member having nuts welded thereto around said bolt insert apertures and at least one weld position which is distanced from said bolt insert apertures and at which position said plate member is welded to the striker mounting position of said vehicle body;

said plate member being provided with at least one deformable portion which connects said weld position to said nut positions of said plate member, so that said striker mounting position can be adjusted by the deformation of said deformable portion when said striker is mounted on said vehicle body by means of bolts which are engaged with said nuts.

2. A structure for mounting a striker as set forth in claim 1, wherein said plate member including said at least one deformable portion is formed by pressing.

3. A structure for mounting a striker as set forth in claim 2, wherein said plate member has a large opening so that two deformable portions are formed as continuous thin remaining portions on the periphery of said plate member.

4. A structure for mounting a striker as set forth in claim 2, wherein said plate member has two openings formed between the respective nut mounting positions and the weld position so that the deformable portion is formed as a thin remaining portion which connects said weld position to said nut mount positions of said plate member.

5. A structure for mounting a striker as set forth in claim 2, wherein said plate member has a large opening between the two weld portions so that the deformable portions are formed as thin remaining peripheral portions which connect said weld portions to the main part of said plate member.

* * * * *